(12) United States Patent
Heirung et al.

(10) Patent No.: US 12,221,102 B2
(45) Date of Patent: Feb. 11, 2025

(54) MAXIMUM SPEED DEPENDENT PARAMETER MANAGEMENT FOR AUTONOMOUS VEHICLES

(71) Applicant: GM CRUISE HOLDINGS LLC, San Francisco, CA (US)

(72) Inventors: Tor Aksel Notland Heirung, San Francisco, CA (US); Eva Fornaeus, Flushing, NY (US); Adrian Kit Malaran, San Francisco, CA (US); William Silva, San Rafael, CA (US); Eric Lujan, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 316 days.

(21) Appl. No.: 17/833,084

(22) Filed: Jun. 6, 2022

(65) Prior Publication Data
US 2023/0391327 A1 Dec. 7, 2023

(51) Int. Cl.
| | | |
|---|---|---|
| *G08G 1/00* | (2006.01) | |
| *B60W 30/14* | (2006.01) | |
| *B60W 40/105* | (2012.01) | |
| *B60W 50/00* | (2006.01) | |
| *G05D 1/00* | (2006.01) | |

(52) U.S. Cl.
CPC ........ *B60W 30/143* (2013.01); *B60W 40/105* (2013.01); *B60W 50/00* (2013.01); *G05D 1/0016* (2013.01); *B60W 2050/0083* (2013.01); *B60W 2556/50* (2020.02)

(58) Field of Classification Search
CPC .. B60W 30/143; B60W 40/105; B60W 50/00; B60W 2050/0083; B60W 2556/50; B60W 2050/0026; B60W 2556/55; B60W 2720/10; B60W 10/00; G05D 1/0016; G08G 1/00
USPC .......................................................... 701/93
See application file for complete search history.

(56) References Cited

U.S. PATENT DOCUMENTS

| | | | |
|---|---|---|---|
| 2015/0025731 A1* | 1/2015 | Uehara ............... | B60W 50/082 701/23 |
| 2016/0339915 A1* | 11/2016 | Kuwahara ............ | B60W 50/10 |
| 2019/0025820 A1* | 1/2019 | Ferguson ............. | G08G 1/0112 |
| 2022/0289248 A1* | 9/2022 | Niewiadomski .. | B60W 50/0098 |

\* cited by examiner

*Primary Examiner* — Shardul D Patel
(74) *Attorney, Agent, or Firm* — Dimitri Kirimis

(57) ABSTRACT

Approaches for top speed dependent operational parameter configuration are disclosed. An operational parameter to be used by an autonomous vehicle is received. Operational modes and corresponding operational regions are determined based on the received operational parameter. A first set of autonomous vehicle parameters are determined and set based on the received operational parameter. A second set of autonomous vehicle parameters are determined and set based on the first set of autonomous vehicle parameters.

18 Claims, 7 Drawing Sheets

MAXIMUM SPEED DEPENDENT PARAMETER MANAGEMENT FOR AUTONOMOUS VEHICLES

TECHNICAL FIELD

Examples provided herein relate to managing and utilizing parameters for an autonomous vehicle. More particularly, examples provided herein relate to non-linear management of operating parameters for autonomous vehicles.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
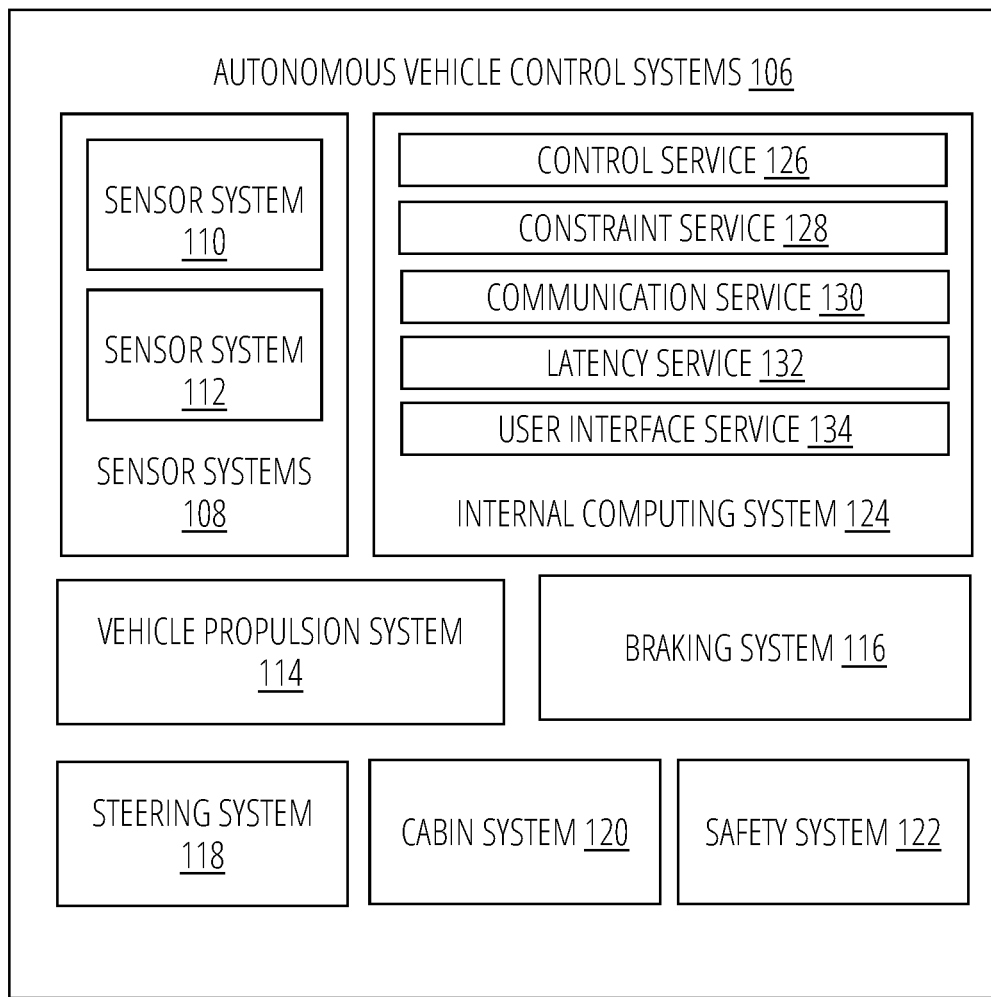
FIG. 1 is a block diagram of an example autonomous vehicle.
Figure 1:
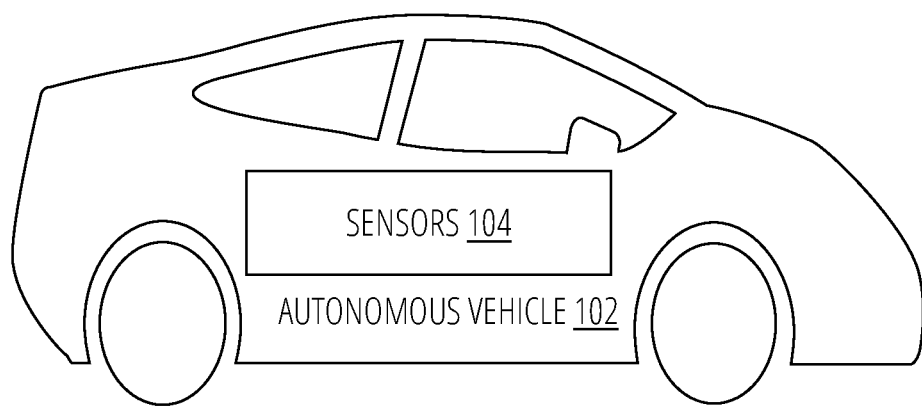

Successful operation of autonomous vehicles involves management of complex interactions involving various components and systems, each of which can have interrelated sets of operational parameters (examples of which are provided below). As a simple example, operation of an autonomous vehicle at or below 25 miles per hour (40 kilometers per hour) requires a different set of operational parameters than operating the same autonomous vehicle at or below 45 miles per hour (72 kilometers per hour).

In an example, a top speed for an autonomous vehicle can be set through a parameter at launch, and that top speed parameter can influence various aspects of autonomous vehicle behavior (e.g., reasoning about lane changes, speed reduction through narrow gaps, how far ahead to plan, where to focus attention, at what distance to consider traffic directives). The top speed parameter can be based on various factors including, for example, the operational design domain (ODD) for the autonomous vehicle. The top speed parameter indicates the maximum allowable speed for the vehicle to operate autonomously. As discussed below, under certain conditions the vehicle may exceed the parameter-indicated speed in a non-autonomous mode.

In general, the ODD specifies operating conditions under which the subject autonomous vehicle is allowed to operate. The ODD may be defined in terms of environmental restrictions, geographical restrictions, time of day restrictions, presence or absence of certain other characteristics (e.g., road type, including paved or unpaved roads) and/or other features. The ODD can be used to limit when and where the autonomous vehicle can operate so that the autonomous vehicle operates in conditions for which it has been designed and tested.

The designated top speed for an autonomous vehicle can influence a range of decision making algorithms and control mechanisms at various levels of control and data acquisition, which influences many behaviors of the autonomous vehicle. For example, reactions to traffic lights (e.g., yellow lights) and merging behavior is different at higher speeds as compared to lower speeds. This change in behavior based on maximum (or expected maximum) speed in an operational environment applies to other road users as well, which should be considered by the autonomous vehicle when evaluating conditions involving other road users.

Control and evaluation procedures may be increasingly fine-grained based on a maximum allowable top speed. Various mechanisms can be utilized to set the maximum allowable top speed for an autonomous vehicle. In an example, the top speed can be set through an interface (e.g., user interface, management interface, configuration interface) directly on the autonomous vehicle. In another example, the maximum allowable top speed can be set from a control center that can have some measure of control over multiple autonomous vehicles in a fleet of autonomous vehicles. This may be useful for a fleet of autonomous vehicles that provide a ride sharing service and/or a fleet of autonomous vehicles that provide delivery services as it allows fro a singular set of actions to alter the maximum allowable top speed for multiple autonomous vehicles.

In response to receiving the maximum allowable top speed, the autonomous vehicle can set/adjust/modify one or more other parameters in response to the maximum allowable top speed. The other parameters can have various relationships to the maximum allowable top speed. For example, a parameter can be a linear function of the maximum allowable top speed (e.g., ideal following distance). As another example, a parameter can be a non-linear function of the maximum allowable top speed (e.g., the autonomous vehicle can use a non-linear function to define a relationship between the maximum top speed and a speed distance caution (i.e., a passing distance between the autonomous vehicle and a road object for a given speed)).

As a further example, parameters can be set based on ranges with respect to the maximum allowable top speed (e.g., a tracking and/or detection distance for traffic lights and/or other objects may be set based on maximum top speed ranges such that when a first set of maximum top speeds are used by the autonomous vehicle, the autonomous vehicle detects traffic lights and/or other objects within a first distance and when a second set of maximum top speeds are used by the autonomous vehicle (greater than the first set), the autonomous vehicle detects traffic lights and/or other objects within a second distance (greater than the first distance).

In an example, an autonomous vehicle can perform one or more training routes in response to a change in the maximum allowable top speed. The training routes can allow autonomous vehicle 102 to be monitored to determine whether autonomous vehicle 102 is operating appropriately with the new/changed maximum allowable top speed. Different training routes can be used for different maximum allowable top speeds. Various other training procedures may also be associated with a change in maximum allowable top speed.

Not all parameters that are influenced by the maximum allowable top speed are directly influenced by the maximum allowable top speed. For example, there may be dependent relationships between parameters where a first set of one or more parameters are set based on the maximum allowable top speed and a second set of one or more parameters are set based on the first set of one or more parameters. For example, the maximum top speed can be used to select a subset of roads on which the autonomous vehicle is allowed to travel and, based on the subset of roads (and possibly other factors), time of day parameters can be determined. As another example, the maximum top speed can be used to determine a set of driving maneuvers (e.g., right turn, pass on the left) that are allowed, and, based on the allowed driving maneuvers (and possibly other factors), lower-level operational parameters (e.g., max/min turn rate of change, max/min deceleration) can be determined. Other types of cascading relationships can exist between parameters.

Many of the examples that follow are focused on the use of a maximum top speed in an autonomous vehicle setting. However, there are cases where the autonomous vehicle can be instructed to (or an autonomous vehicle operations center can instruct the vehicle to) travel on a road where the maximum top speed is too low. In these cases, the autonomous vehicle operations center can take over the car (manually control operation of the vehicle) and the maximum top speed would no longer be applied.

In some cases, this manual operation can be planned by the autonomous vehicle and the autonomous vehicle operations center will be instructed to takeover operation of the autonomous vehicle during a particular segment of the journey.

In an example, when an autonomous vehicle encounters a road that the maximum top speed would not be sufficient to ensure a safe trip, the autonomous vehicle can perform stop in the roadway for the autonomous vehicle operations center to takeover (a forced TKO/takeover) and this allows the autonomous vehicle to travel on roadways that would otherwise not be safe. This can be particularly useful when encountering a major street from a minor street (e.g., crossing or merging/turning onto).

In some cases, the autonomous vehicle compares the speed limit of the major road with maximum top speed to determine if the difference between the two exceeds a threshold value (e.g., 5, 10, 15 mph). Although described in relation to turning onto or crossing a new road, this could similarly apply for the autonomous vehicle traveling on a road with a changing speed limit (e.g., a segment of a road is 40 mph and a next segment of the same road is 60 mph).

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 102 can further include mechanical systems to control and manage motion of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. Safety system 122 can include one or more radar systems. Autonomous vehicle 102 can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems can operate in the 77 GHz band (e.g., 76-81 GHz). SRR systems can be used, for example, for blind spot detection or collision avoidance. SRR systems can operate in the 24 GHz band. MRR systems can operate in either the 24 GHz band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120 and safety system 122). Internal computing system 124 includes at least one processor and at least one memory system that can store executable instructions to be executed by the processor. Internal computing system 124 can include any number of computing subsystems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132 and internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132 and user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup and/or dropoff requests and/or locations), etc.

Control service 126 and/or user interface service 134 can receive the maximum allowable top speed to be used for control of operation of autonomous vehicle 102. Various examples of how the maximum allowable top speed is received and/or how the maximum allowable top speed is utilized within internal computing system 124 are described in greater detail below.

In some examples described herein autonomous vehicle 102 (or another device) may be described as collecting data corresponding to surrounding vehicles. This data may be collected without associated identifiable information from these surrounding vehicles (e.g., without license plate numbers, make, model, and the color of the surrounding vehicles). Accordingly, the techniques mentioned here can be used for the beneficial purposes described, but without the need to store potentially sensitive information of the surrounding vehicles.

Figure 2:
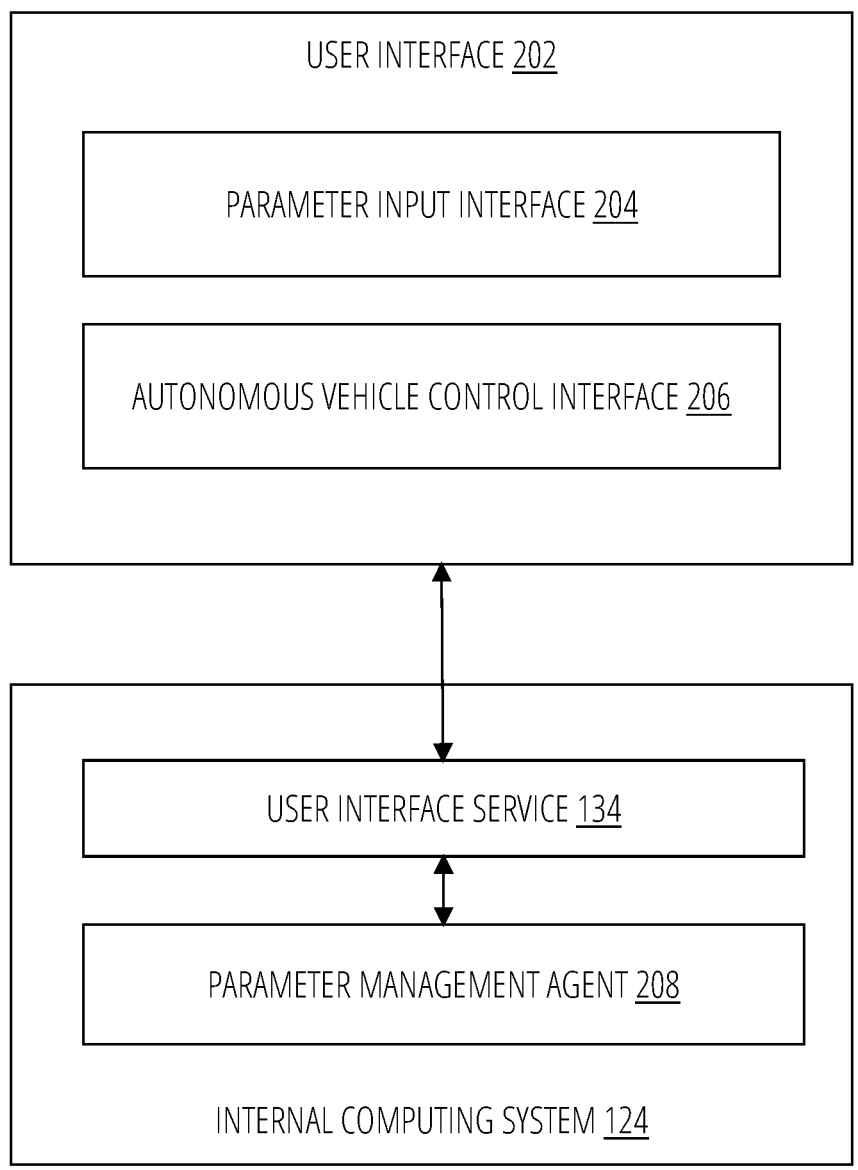
FIG. 2 illustrates an example approach to providing parameters, including a maximum allowable top speed, to an autonomous vehicle.

FIG. 2 illustrates an example approach to providing parameters, including a maximum allowable top speed, to an autonomous vehicle. The example of FIG. 2 corresponds to a situation in which a maximum allowable top speed parameter is provided via a user interface corresponding (e.g., a screen integrated within the autonomous vehicle, on a screen on a remote device wirelessly coupled to the autonomous vehicle, and/or on a portable device that is adjacent to the autonomous vehicle and wirelessly connected or connected to the autonomous vehicle via a set of wires) to the autonomous vehicle.

Internal computing system 124 can provide the functionality as described above with respect to FIG. 1, including user interface service 134, which can support operation of user interface 202. In an example, user interface 202 can provide various input or control interfaces that can allow internal computing system 124 to receive inputs via user interface service 134. User interface 202 can provide additional functionality including, for example, status or operational information to a user.

In an example, parameter input interface 204 can receive one or more parameters that can be used to control operation of the host autonomous vehicle (e.g., autonomous vehicle 102). Parameter input interface 204 can receive a maximum allowable top speed for the autonomous vehicle. In an example, parameter input interface 204 is only accessible at certain user levels (e.g., administrator) and/or is only accessible at certain times (e.g., initialization and/or configuration of autonomous vehicle 102).

Autonomous vehicle control interface 206 can provide an interface to input/modify/verify other operational parameters or settings other than a maximum top speed of the autonomous vehicle (e.g., how to respond to warnings, headlight operation settings). As mentioned above, user interface service 134 interacts with user interface 202 and other user interface elements (e.g., autonomous vehicle control interface 206) to provide information to and from parameter management agent 208 and internal computing system 124.

As described in greater detail below, the components of FIG. 2 can accept and process parameters, including a maximum allowable top speed for the autonomous vehicle, which can then be used by internal computing system 124 to manage parameters of other components and services within the host autonomous vehicle.

Figure 3:
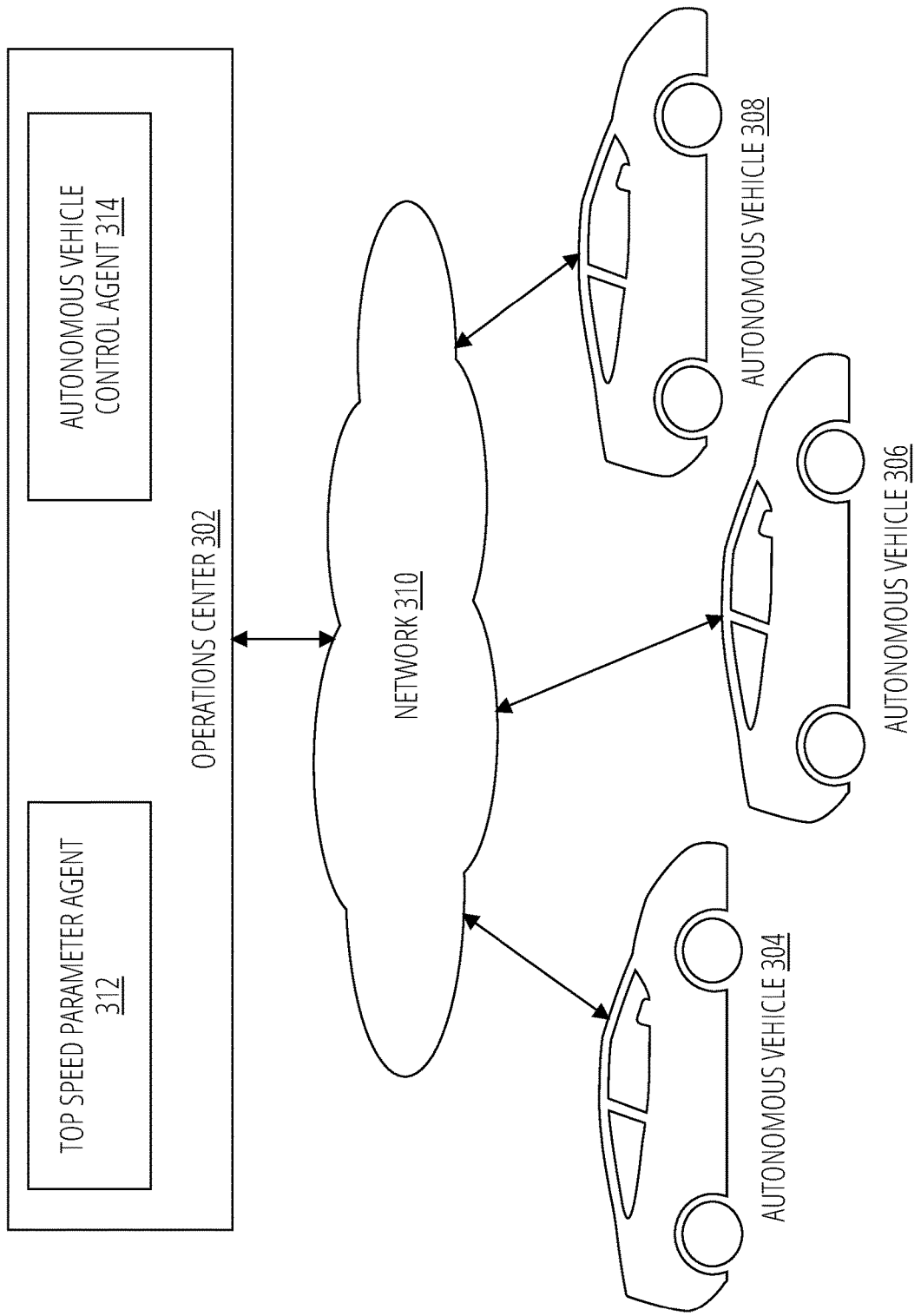
FIG. 3 illustrates an example approach to providing parameters, including a maximum allowable top speed to one or more autonomous vehicles.

FIG. 3 illustrates an example approach to providing parameters, including a maximum allowable top speed to one or more autonomous vehicles. The example of FIG. 3 corresponds to where a maximum allowable top speed parameter is provided via a network connection to one or more autonomous vehicles.

Operations center 302 can collect information about the operation of one or more autonomous vehicles (e.g., autonomous vehicle 304, autonomous vehicle 306, autonomous vehicle 308) in a fleet of autonomous vehicles via network 310. Operations center 302 can also provide operational commands and/or operation parameters to the autonomous vehicles, including, for example, a maximum allowable top speed for the corresponding autonomous vehicle. In an example, each of the autonomous vehicles can include the components and systems of autonomous vehicle 102 as described with respect to FIG. 1.

As described in greater detail below, the autonomous vehicles of FIG. 3 can accept and process parameters, including maximum allowable top speed for the autonomous vehicle, which can then be used, for example, by internal computing system 124 to manage parameters of other components and services within the host autonomous vehicle.

Operations center 302 can include top speed parameter agent 312 and autonomous vehicle control agent 314 to manage parameters to be utilized by the autonomous vehicles. Top speed parameter agent 312 can receive top speed information for various autonomous vehicles, which can be different for different vehicles or for different ODDs. Autonomous vehicle control agent 314 can manage other parameters to be utilized by the autonomous vehicles.

Figure 4:
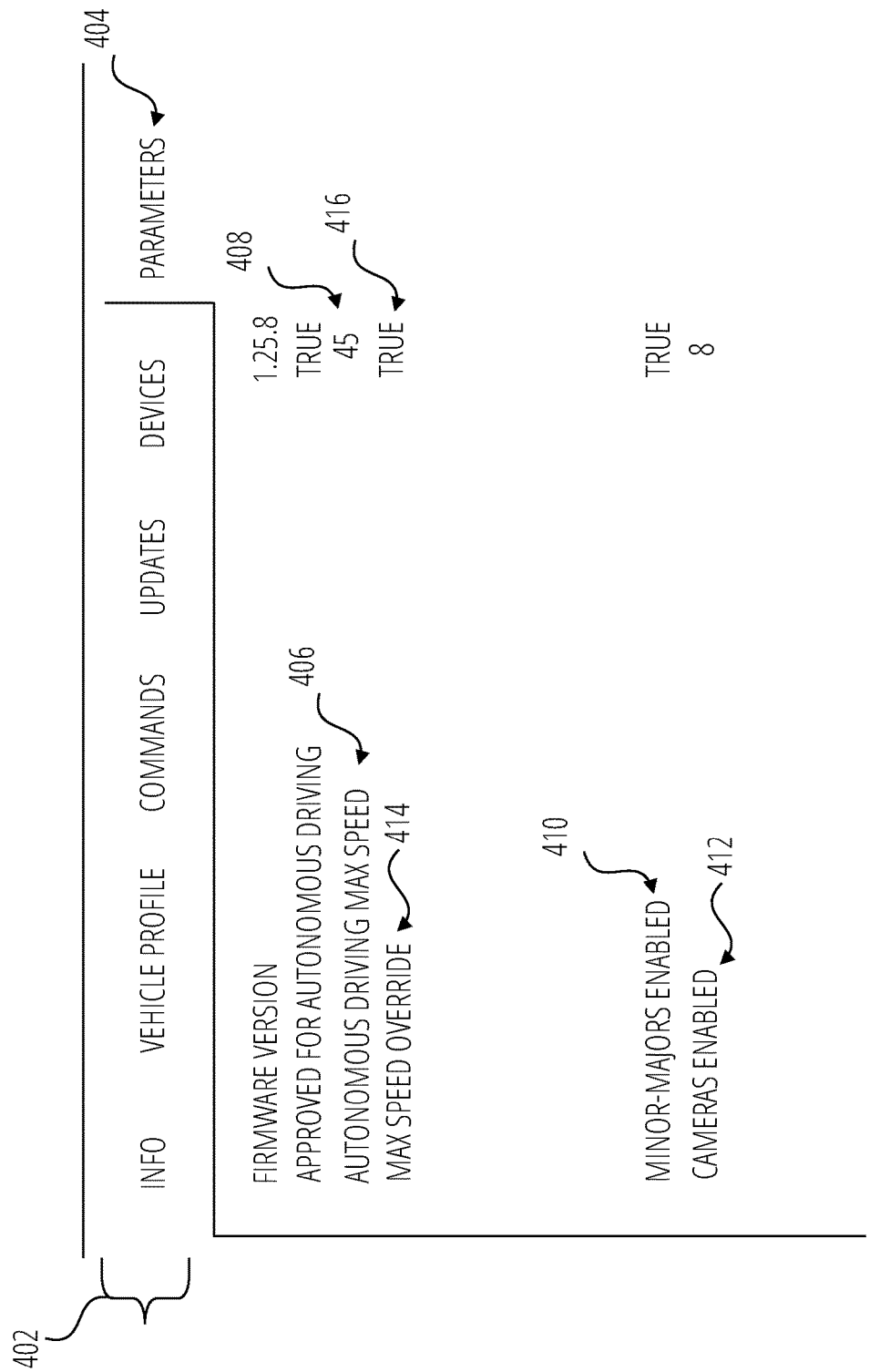
FIG. 4 illustrates an example interface for viewing and/or managing operational parameters of an autonomous vehicle.

FIG. 4 illustrates an example interface for viewing and/or managing operational parameters of an autonomous vehicle. The graphical user interface (GUI) of FIG. 4 can be provided via user interface 202 (e.g., as part of parameter input interface 204), for example. As another example, the GUI of FIG. 4 can be provided to a user in operations center 302 (e.g., via autonomous vehicle control agent 314).

The example GUI can provide various tabs/modules 402 (e.g., Info, Vehicle Profile, Commands, Updates, Devices, Parameters) to allow a user to navigate to the corresponding features and functionalities. In the example of FIG. 4 parameters tab 404 is selected that provides a listing of parameters for the autonomous vehicle. Some of the parameters can be set via the GUI and some can be provided for informational purposes.

The example 404 in FIG. 4 illustrates a small number of parameters of different types; however, any number of parameters of various types can be configured and/or presented via parameters tab 404. Within parameters tab 404, the parameter autonomous driving maximum speed 406 can be displayed with a corresponding value 408. In the example of FIG. 4 the maximum speed is 45 miles per hour, but any appropriate value can be used. The example value of 45 miles per hour may exceed the speed limits in congested cities and the autonomous vehicle may operate better with a lower autonomous driving maximum speed 406 in those environments.

Other parameters (e.g., minor-majors enabled 410, cameras enabled 412) may be dependent on the value 408 corresponding to autonomous driving maximum speed 406. As discussed herein, various parameters can be set in relation to autonomous driving maximum speed 406 and additional parameters may be set in a cascading manner starting with autonomous driving maximum speed 406.

In an example, the parameters tab 404 can include maximum speed override 414 parameter and corresponding value 416 to indicate that autonomous driving maximum speed 406 value (e.g., 408) can be invalid based on one or more other parameters of the autonomous vehicle (e.g., the set ODD of the vehicle).

In another example, a table of maximum allowable top speeds can be provided to the autonomous vehicle with a set of parameters (e.g., ODD, weather conditions (e.g., raining, snow, dry), autonomous vehicle takeover experience, etc.) and the autonomous vehicle can select the appropriate maximum allowable top speed based on a correspondence with the set parameters (or best fit analysis).

Figure 5:
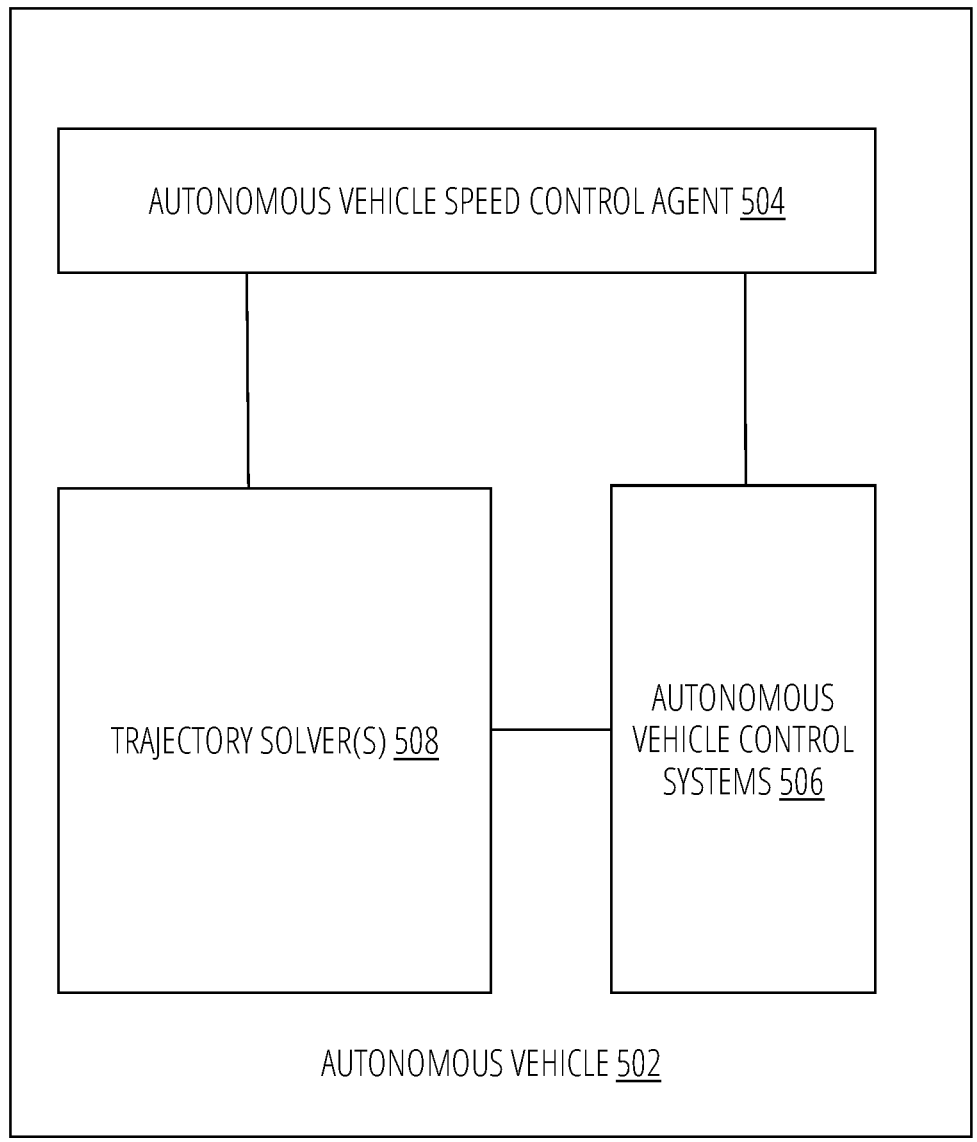
FIG. 5 is a block diagram of an example set of autonomous vehicle components that can determine and use parameters based on a received maximum allowable top speed for the autonomous vehicle.

FIG. 5 is a block diagram of an example set of autonomous vehicle components that can determine and use parameters based on a received maximum allowable top speed for the autonomous vehicle. The specific components illustrated in FIG. 5 can be a subset of components that are included in autonomous vehicle 502, which can be analogous to autonomous vehicle 102 of FIG. 1.

Autonomous vehicle speed control agent 504 can receive a parameter indicating a maximum allowable top speed for autonomous vehicle 502. The maximum allowable top speed can be received by autonomous vehicle 502 via a user interface (e.g., as described with respect to FIG. 2), for example, during a configuration or initiation stage of autonomous vehicle 502, or the maximum allowable top speed can be received via a network connection (wired or wireless). In an example, the maximum allowable top speed can be received at any time, but is applied using the approaches described herein during the configuration or initiation stages (e.g., startup/reset of the autonomous vehicle 102 or startup/reset of internal computing system 124). Alternatively, immediate application can be supported for some situations (e.g., emergency conditions).

Autonomous vehicle speed control agent 504 can provide the received maximum allowable top speed to autonomous vehicle control systems 506 for use in controlling the speed of autonomous vehicle 502. In an example, autonomous vehicle control systems 506 can set other parameters (e.g., braking and/or stopping parameters (e.g., the stopping distance can be set as a function of a maximum allowable top speed and/or a comfort level selected for passengers of the autonomous vehicle), an emergency comfort level, which corresponds to the various control (e.g., braking, steering) system parameters for a hard stop in an emergency situation, which can be dependent on maximum top speed and/or current speed, and a nominal comfort level, which corresponds to a gentle/gradual stop when no emergencies or other exigent circumstances are present, acceleration parameters (e.g., greater acceleration when maximum top speed is higher to merge with traffic), following distance parameters (e.g., greater for higher speeds and increased as a non-linear function of current speed), RADAR system parameters (e.g., increased transmission power)) based on the received maximum allowable top speed.

Autonomous vehicle speed control agent 504 can also provide the received maximum allowable top speed to trajectory solver(s) 508, which can include any number of trajectory solvers. In an example, trajectory solver(s) 508 can include a rough trajectory solver and a final trajectory solver where the rough trajectory solver uses a first set of parameters and techniques to determine one or more approximate trajectories for autonomous vehicle 502. The final trajectory solver can operate on the one or more approximate trajectories and use a second set of parameters and techniques to determine a final trajectory for autonomous vehicle 502 that is provided to autonomous vehicle control systems 506 for control of autonomous vehicle 502.

In another example, trajectory solver(s) 508 can include both lateral and longitudinal solvers that can determine trajectory components based on parameters determined from the received maximum allowable top speed. Other trajectory solver configurations can also be supported.

Trajectory solver(s) 508 can receive the maximum allowable top speed from autonomous vehicle speed control agent 504 and set various parameters within trajectory solver(s) 508 for use in performing the corresponding functionalities. In an example, the determination and setting of parameters can include dependencies where a first set of parameters is determined based on the maximum allowable top speed and a second set of parameters is based on the first set of parameters and/or the maximum allowable top speed (alone or in combination). For example, an ODD may be set based on the maximum allowable top speed, which can specify the roads the autonomous vehicle can use, the time of day the autonomous vehicle can operate, the days of the week the auto can operate, etc. From the maximum allowable top speed and the ODD, additional operational parameters can be determined, for example, Thus, a hierarchical structure of parameters can be determined and/or maintained based on the received maximum allowable top speed.

Figure 6:
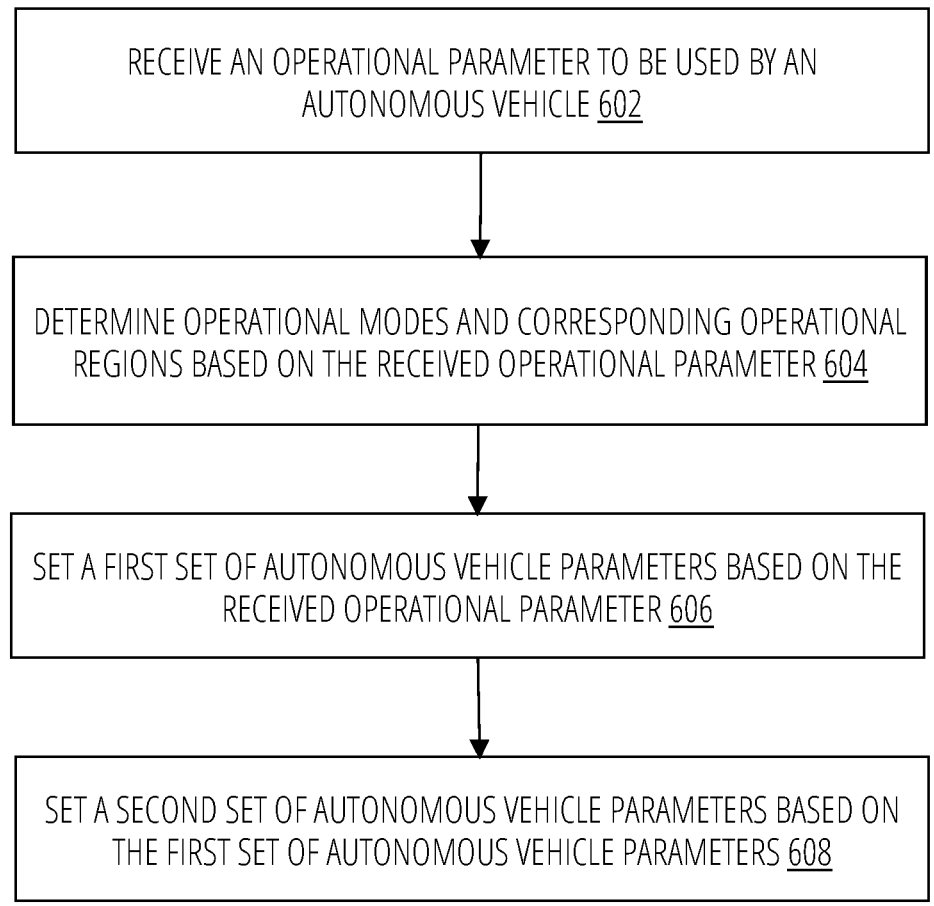
FIG. 6 is a flow diagram for one technique for determining and setting operational parameters based on a maximum allowable top speed for an autonomous vehicle.

FIG. 6 is a flow diagram for one technique for determining and setting operational parameters based on a maximum allowable top speed of an autonomous vehicle. The example technique as illustrated in FIG. 6 can be based on an operational parameter (e.g., maximum allowable top speed) received from an interface of the autonomous vehicle (e.g., FIG. 2) or over a network connection from a remote source (e.g., FIG. 3).

An operational parameter to be used by an autonomous vehicle is received at operation 602. As discussed above, the operational parameter can be received directly at the autonomous vehicle or via a network interface. In an example, the operational parameter is a maximum allowable top speed for the autonomous vehicle.

In an example, the maximum allowable top speed can correspond to an ODD for the autonomous vehicle. For example, a region where the autonomous vehicle may operate (e.g., a city) may have a lower speed limit than another region where the autonomous vehicle may operate (e.g., a rural area). The operational parameter may be related to other conditions, for example, time of day (e.g., higher maximum allowable top speed during daylight hours).

Operational modes and corresponding operational regions are determined based on the received operational parameter at operation 604. In an example, one or more operational modes and/or one or more operational regions can be determined based on the received operational parameter (e.g., maximum allowable top speed). In an example, when a maximum allowable top speed is received, the autonomous vehicle control systems can determine specific roads, intersections, and the like where the autonomous vehicle can operate effectively by operating at expected speeds within the region (e.g., not be too slow as to impede the flow of traffic, not be too fast as to cause unsafe conditions for others).

In an example, maximum allowable road grade may be determined based on the received maximum allowable top speed, which can be used to adjust the ODD. Road grade may also be combined with road type (e.g., urban collectors, urban arterials) to determine a corresponding ODD. As another example, minimum radius of curvature can be a function of speed limit, road grade, side friction factor, and the like, which based on the maximum allowable top speed can be used to determine an ODD and/or operational modes for the autonomous vehicle with respect to road curvature.

Similarly, operational modes can be determined based on the maximum allowable top speed. For example, a human operator (either in the car or in an operations center) may be required to be available to assume control of the autonomous vehicle.

A first set of autonomous vehicle parameters can be determined and set based on the received operational parameter at operation 606. Autonomous vehicle parameters that are based on the received maximum allowable top speed can be determined in various manners (e.g., some relationships may be linear and other relationships non-linear). For example, a higher maximum allowable top speed can require larger gaps in traffic for an autonomous vehicle to make a right turn. As another example, a higher maximum allowable top speed can require greater following distances. Many other parameters can be determined based on the received maximum allowable top speed.

A second set of autonomous vehicle parameters can be determined and set based on the received operational parameter at operation 608. Additional parameters for the autonomous vehicle can be determined and set based on the received maximum allowable top speed and/or the first set of parameters that are determined based on the received maximum allowable top speed. Some parameters in the second set of parameters can be a function of the received maximum allowable top speed and one or more of the parameters in the first set of parameters.

Figure 7:
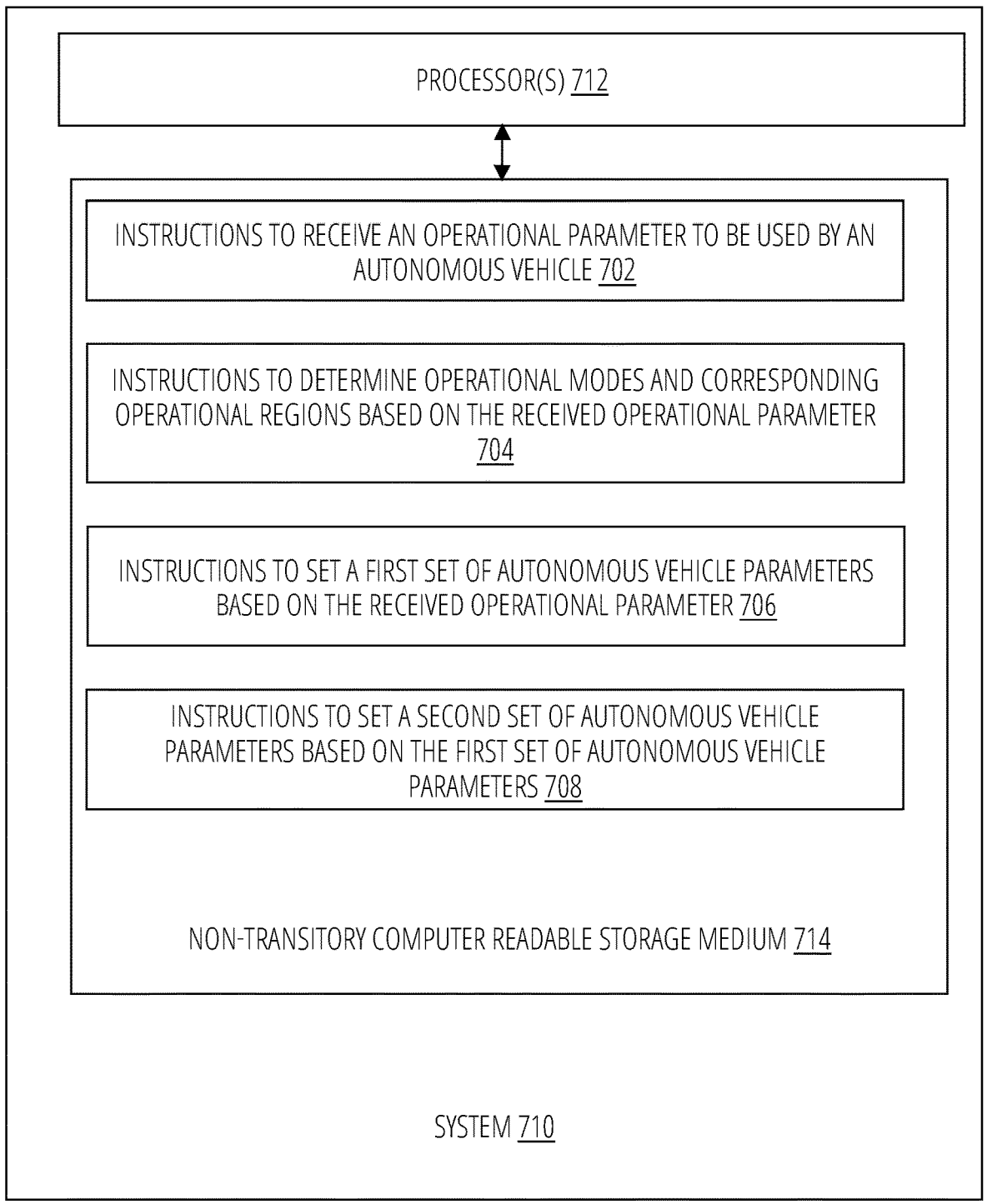
FIG. 7 is a block diagram of one example of a processing system that can determine and set operational parameters based on a maximum allowable top speed to an autonomous vehicle.

FIG. 7 is a block diagram of one example of a processing system that can determine and set operational parameters based on maximum allowable top speed to an autonomous vehicle. In one example, system 710 can be part of an autonomous vehicle (e.g., autonomous vehicle 102 as part of internal computing system 124) that utilizes various sensors including radar sensors. In other examples, system 710 can be part of a human-operated vehicle having an advanced driver assistance system (ADAS) that can utilize various sensors including radar sensors.

In an example, system 710 can include processor(s) 712 and non-transitory computer readable storage medium 714. Non-transitory computer readable storage medium 714 may store instructions 702, 704, 706 and 708 that, when executed by processor(s) 712, cause processor(s) 712 to perform various functions. Examples of processor(s) 712 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 714 include tangible media such as random access memory (RAM), read-only memory (ROM), electrically erasable programmable read-only memory (EEPROM), flash memory, a hard disk drive, etc.

Instructions 702 cause processor(s) 712 to receive an operational parameter to be used by an autonomous vehicle. The operational parameter can be received directly at the autonomous vehicle or via a network interface. In an example, the operational parameter is a maximum allowable top speed for the autonomous vehicle.

Instructions 704 cause processor(s) 712 to determine operational modes and corresponding operational regions based on the received operational parameter. In an example, the maximum allowable top speed can correspond to an ODD for the autonomous vehicle. For example, a region where the autonomous vehicle may operate (e.g., selected areas of San Francisco, CA) may have a lower speed limit than another region where the autonomous vehicle may operate (e.g., selected regions of Scottsdale, AZ). The operational parameter may be related to other conditions, for example, day of the week (e.g., higher maximum allowable top speed on weekends). Similarly, operational modes can be determined based on the maximum allowable top speed.

Instructions 706 cause processor(s) 712 to set a first set of autonomous vehicle parameters based on the received operational parameter. Autonomous vehicle parameters that are based on the received maximum allowable top speed can be determined in various manners (e.g., some relationships may be linear and other relationships non-linear). For example, a higher maximum allowable top speed can require larger gaps in traffic for an autonomous vehicle to change lanes. As another example, a higher maximum allowable top speed can require earlier braking for a stop sign or traffic light. Many other parameters can be determined based on the received maximum allowable top speed.

Instructions 708 cause processor(s) 712 to set a second set of autonomous vehicle parameters based on the first set of autonomous vehicle parameters. Additional parameters for the autonomous vehicle can be determined and set based on the received maximum allowable top speed and/or the first set of parameters that are determined based on the received maximum allowable top speed. Some parameters in the second set of parameters can be a function of the received maximum allowable top speed and one or more of the parameters in the first set of parameters.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 714 has stored thereon data representing sequences of instructions that, when executed by a processor(s) 712, cause the processor(s) 712 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. An autonomous vehicle comprising:
   sensor systems to detect characteristics of an operating environment;
   a vehicle control system coupled with the sensor systems, the vehicle control system to:
   receive an operational parameter to be used by an autonomous vehicle;
   determine operational modes and corresponding operational regions based on the received operational parameter;
   set a first set of autonomous vehicle parameters based on the received operational parameter;
   set a second set of autonomous vehicle parameters based on the first set of autonomous vehicle parameters,
   wherein the vehicle control system is further configured to select an appropriate maximum allowable top speed from a table of maximum allowable top speeds having corresponding parameters based on a correspondence of operating conditions with the parameters.

2. The autonomous vehicle of claim 1 wherein the operational parameter comprises a maximum allowable top speed for the autonomous vehicle.

3. The autonomous vehicle of claim 1 wherein the operational regions correspond to an operational design domain (ODD) having speed limits within a maximum allowable top speed for the autonomous vehicle and the operational modes correspond to autonomous operation and non-autonomous driving.

4. The autonomous vehicle of claim 3 wherein autonomous driving corresponds to full autonomous driving by the autonomous vehicle and non-autonomous driving corresponds to use of human-provided input for operation of the autonomous vehicle.

5. The autonomous vehicle of claim 1 wherein the operational parameter is received via an interface of the autonomous vehicle.

6. The autonomous vehicle of claim 1 wherein the operational parameter is received via a network connection from a remote operations center.

7. A non-transitory computer-readable medium having stored thereon instructions that, when executed by one or more processors, are configurable to cause the processors to: receive an operational parameter to be used by an autonomous vehicle; determine operational modes and corresponding operational regions based on the received operational parameter; set a first set of autonomous vehicle parameters based on the received operational parameter; set a second set of autonomous vehicle parameters based on the first set of autonomous vehicle parameters, wherein the one or more processor are further configured to select an appropriate maximum allowable top speed from a table of maximum allowable top speeds having corresponding parameters based on a correspondence of operating conditions with the parameters.

8. The non-transitory computer-readable medium of claim 7 wherein the operational parameter comprises a maximum allowable top speed for the autonomous vehicle.

9. The non-transitory computer-readable medium of claim 7 wherein the operational regions correspond to an operational design domain (ODD) having speed limits within a maximum allowable top speed for the autonomous vehicle and the operational modes correspond to autonomous operation and non-autonomous driving.

10. The non-transitory computer-readable medium of claim 9 wherein autonomous driving corresponds to full autonomous driving by the autonomous vehicle and non-autonomous driving corresponds to use of human-provided input for operation of the autonomous vehicle.

11. The non-transitory computer-readable medium of claim 7 wherein the operational parameter is received via an interface of the autonomous vehicle.

12. The non-transitory computer-readable medium of claim 7 wherein the operational parameter is received via a network connection from a remote operations center.

13. A system comprising: a memory system; and one or more hardware processors coupled with the memory system, the one or more processors to:
- receive an operational parameter to be used by an autonomous vehicle;
- determine operational modes and corresponding operational regions based on the received operational parameter;
- set a first set of autonomous vehicle parameters based on the received operational parameter;
- set a second set of autonomous vehicle parameters based on the first set of autonomous vehicle parameters,
- wherein the one or more hardware processors are further configured to select an appropriate maximum allowable top speed from a table of maximum allowable top speeds having corresponding parameters based on a correspondence of operating conditions with the parameters.

14. The system of claim 13 wherein the operational parameter comprises a maximum allowable top speed for the autonomous vehicle.

15. The system of claim 13 wherein the operational regions correspond to an operational design domain (ODD) having speed limits within a maximum allowable top speed for the autonomous vehicle and the operational modes correspond to autonomous operation and non-autonomous driving.

16. The system of claim 15 wherein autonomous driving corresponds to full autonomous driving by the autonomous vehicle and non-autonomous driving corresponds to use of human-provided input for operation of the autonomous vehicle.

17. The system of claim 13 wherein the operational parameter is received via an interface of the autonomous vehicle.

18. The system of claim 13 wherein the operational parameter is received via a network connection from a remote operations center.

* * * * *